United States Patent [19]

Hatakka et al.

[11] 4,049,143
[45] Sept. 20, 1977

[54] TRAILER-TYPE VEHICLE FOR LIFTING, TRANSPORTING, AND DEPOSITING LOADS

[75] Inventors: Vesa Hatakka, Helsinki; Jussi Sarvela, Espoo, both of Finland

[73] Assignee: Oy Innovation Services Co., Finland

[21] Appl. No.: 709,096

[22] Filed: July 27, 1976

[30] Foreign Application Priority Data

Jan. 19, 1976 Finland .............................. 760113

[51] Int. Cl.² .............................................. B60P 1/34
[52] U.S. Cl. .................................... 214/390; 280/656
[58] Field of Search ............... 214/313, 314, 390, 392, 214/502; 298/11; 280/656

[56] References Cited

U.S. PATENT DOCUMENTS

| 3,083,850 | 4/1963 | Owen | 214/390 |
| 3,468,440 | 9/1969 | Poole | 214/390 |

Primary Examiner—Robert G. Sheridan
Attorney, Agent, or Firm—Steinberg & Blake

[57] ABSTRACT

A vehicle for lifting, transporting, and depositing a load includes lower and upper substantially U-shaped frames each having a front bar and a pair of side bars extending rearwardly from the front bar, with the front bar of the lower frame capable of being attached to a pulling vehicle, while at least a pair of wheels are connected with the side bars of the lower frame to support the latter during travelling thereof. The upper frame is connected by a suitable connecting structure to the lower frame for movement with respect thereto downwardly to a lower load-receiving position and upwardly to an upper load-transporting position, while a transverse pivot axis is provided for the upper frame so that the latter can turn about this axis during depositing of a load. The two frames define a load-receiving space on opposite sides of which are a pair of expandable and contractable fluid-pressure devices, respectively, each fluid-pressure device being connected to side bars of the lower and upper frames to displace the upper frame between the above positions thereof and to turn the upper frame about the above pivot axis when depositing a load. These fluid-pressure devices expand during movement of the upper frame down to its lower load-receiving position and during turning of the upper frame about the above pivot axis when depositing a load. A structure is provided for releasably holding the pivot axis stationary when the upper frame is turned about the pivot axis during depositing of a load.

14 Claims, 12 Drawing Figures

TRAILER-TYPE VEHICLE FOR LIFTING, TRANSPORTING, AND DEPOSITING LOADS

BACKGROUND OF THE INVENTION

The present invention relates to trailer-type vehicles for lifting, transporting, and depositing loads.

In particular, the invention relates to a vehicle of the above type which has a lower substantially U-shaped frame, which is open at its rear, and a similar a way that the upper frame can be moved downwardly with respect to the lower frame to a load-receiving position and upwardly with respect to the lower frame to a load-transporting position, while a load can also be deposited when the upper frame is in its lower position. This upper frame is also turnable about a transverse pivot axis for depositing a load. Suitable power means, such as hydraulic piston-and-cylinder assemblies, which preferably are double-acting, may be situated on opposite sides of the space for accommodating a load and connected with the frames for displacing the upper frame with respect to the lower frame between the above positions as well as for turning the upper frame about the above pivot axis when depositing a load.

Loading and dumping mechanisms of the above general type are known in connection with transporting vehicles. In the known mechanisms double-acting hydraulic systems have been utilized, for example, in such a way that relatively long hydraulic cylinders are disposed on both sides of the load-receiving space, these cylinders of course accommodating pistons which have piston rods extending from the cylinders, and the opposed ends of such systems are respectively connected with the upper and lower frames in such a way that the lower end of each hydraulic system is situated near the rear of the lower frame and the upper end of each hydraulic system is situated near the front part of the upper frame. In order to lower the upper frame from its transporting position to its load-receiving position, the hydraulic systems of the above type are contracted while the depositing or dumping of a load is achieved by expanding these hydraulic systems. However, these known constructions have certain disadvantages. One of these disadvantages resides in the fact that the pistion rods of the hydraulic systems are unprotected and exposed to damage particularly in the transporting position of the upper frame. In addition, the length of these hydraulic systems and that of the hydraulic tubing associated therewith becomes unfavorably great. Also, a drawback of the conventional constructions resides in the fact that the frames have a certain ineffective length resulting from the fact that the pivot axis for the load-depositing structure is situated unfavorably at a location much too near to the front of the vehicle, so that the load which is deposited also is deposited too near to the front of the vehicle.

A still further drawback of the conventional constructions resides in the fact that when a load is initially raised there is at the same time an undesirably large forward component of movement in a horizontal direction, with the result that the load is unavoidably dragged along the ground before it is lifted clear of the ground. Also, drawbacks reside in a manner in which locking arrangements are provided for securing the load and the frame to each other.

A further serious drawback encountered with known devices of the prior art resides in the fact that such devices are designed only for a given size and type of load. Thus, for different types and sizes of loads it is necessary at the present time to utilize different vehicles.

SUMMARY OF THE INVENTION

It is accordingly a primary object of the present invention to provide a construction which will avoid the above drawbacks.

In particular it is an object of the present invention to provide a construction which enables hydraulic systems, made up of piston-and-cylinder assemblies, to be utilized in vehicles of the above type in a double-acting manner in such a way that without increasing the diameter of the cylinders of such systems, the length through which the systems are expanded and contracted may be substantially less than in previously known structures.

It is also an object of the present invention to provide a structure for maintaining stationary the pivot axis about which the upper frame turns in connection with a load-depositing operation, in such a way that during the initial stage of turning of the upper frame in connection with depositing a load the stresses imposed on the lower frame are so small that these stresses are in no way determinative of the dimensioning of the frame structure.

Also, it is an object of the present invention to provide a construction which will enable the hydraulic systems to be free of any load when the upper frame is in its load-transporting position.

In addition it is an object of the present invention to provide a construction according to which the upper frame when initially raised from its lower position to lift a load, which is to be transported, moves initially in a substantially vertical direction with an extremely small horizontal component of movement, so that dragging of the load on the ground when the load is to be lifted is avoided.

In addition, it is an object of the present invention to provide a construction according to which one of the transporting vehicles of the invention can conveniently be adapted to be connected with another vehicle so as to pull the latter.

Also, it is an important object of the present invention to provide a transporting vehicle of the above general type which can be adjusted so as to be capable of accommodating loads of different types and sizes.

Also, it is an object of the invention to provide a structure which is capable of indicating to the operator the adjusted size of the vehicle.

Furthermore, it is an object of the present invention to provide a construction of this type which is capable of adjusting the size of the vehicle not only quickly and easily but also in such a way that during transportation of a load the adjusted size of the vehicle cannot change.

According to the invention the expandable and contractable hydraulic piston-and-cylinder assemblies, or their equivalent, are arranged in such a way that during both lowering movement of the upper frame to its load-receiving position and upward turning movement of the upper frame about the pivot axis, in connection with depositing a load, the hydraulic systems expand in the same direction, during both of these operations, while between the lower and upper frames there is a releasable holding means which maintains stationary the pivot axis about which the upper frame turns during a load-depositing operation.

Moreover, with the structure of the invention during movement of the upper frame to its load-transporting position, links which pivotally interconnect the lower and upper frames are pulled through and beyond their dead-center vertical positions, in such a way that during load-transporting operations the hydraulic systems are not subjected to any load.

For the purpose of adjusting the size of the frames, they include front bars made up of telescoped elements including a pair of end members and an intermediate member telescopically cooperating therewith, these end members being capable of being displaced toward or away from each other by a power means such as a double-acting hydraulic cylinder or the equivalent thereof. In addition, a scale or the like is provided so that the operator can by viewing the scale see the adjusted width of the load-accommodating space.

According to a further feature of the invention, the movement of the end members of the front beam or bar of the lower frame, for the purpose of adjusting the width of the load-accommodating space, is carried out by a hydraulic power system dimensioned so as to have pushing and pulling forces which cannot overstress the structure on which these forces act. The construction is such that the adjustment of the width of the frames which determine the load-accommodating space can only be carried out when the vehicle is unloaded and also only when the wheels of the vehicle are in motion.

The advantage of these features resides in the fact that at least the changing of the width of the load-accommodating space can be quickly and easily carried out while the vehicle can itself be adapted in a few moments to be appropriate for handling of particular loads the size of which can differ greatly. At the present time there are on the market several different sizes of cassettes, containers, or the like, for receiving the material which is to be transported. Any of these can be accommodated by the vehicle of the invention. The width-modification feature of the invention furthermore has particular advantages in connection with agricultural work, particularly in row drilling operations and in the loading and transporting of large bales of hay. The vehicle of the invention can also be provided, if necessary, with suitable fixing means for handling special loads, such as containers and the like.

Thus, the vehicle of the invention for lifting, transporting, and depositing a load, comprises a lower frame means of substantially U-shaped configuration having a front transverse bar means adapted to be attached to a pulling vehicle and a pair of opposed side longitudinal bar means connected with and extending rearwardly from the front transverse bar means and defining with the latter a space for accommodating a load. At least a pair of wheels are operatively connected respectively with the pair of opposed side bar means to support this lower frame means during travel thereof. An upper frame means also of substantially U-shaped configuration is situated at an elevation higher than the lower frame means and is of substantially the same size and configuration. This upper frame means also has a front transverse bar means and a pair of opposed side bar means connected with this front transverse bar means and extending rearwardly therefrom so as to also define with the lower frame means a space for accommodating a load. A connecting means extends between and is interconnected with the lower and upper frame means to connect the upper frame means to the lower frame means for movement with respect thereto downwardly to a lower load-receiving position and upwardly to an upper load-transporting position. This connecting means also provides the upper frame means with a transverse pivot axis about which this upper frame means can turn when carrying out a load-depositing operation. A pair of expandable and contractable fluid-pressure means are respectively situated on opposite sides of and beyond the load-accommodating space defined by the upper and lower frame means with each fluid-pressure means being operatively connected to a side bar means of the lower frame means and a side bar means of the upper frame means for lowering the upper frame means from the upper load-transporting position thereof down to the lower load-receiving position thereof during expansion of each fluid-pressure means and for turning the upper frame means about the pivot axis during a load-depositing operation also during expansion of each fluid-pressure means. A releasable holding means is operatively connected between part of the connecting means and the lower frame means for releasably holding the pivot axis stationary during turning of the upper frame means about this pivot axis when carrying out a load-depositing operation.

BRIEF DESCRIPTION OF DRAWINGS

The invention is illustrated by way of example in the accompanying drawings which form part of this application and in which:

FIG. 1 is a schematic side elevation of a vehicle according to the invention with the front of the vehicle being shown at the right of FIG. 1, the upper frame means being shown in solid lines in its load-transporting position in FIG. 1, while FIG. 1 shows in phantom lines the lower load-receiving position of the upper frame means as well as the movement of the upper frame means and hydraulic structure connected thereto during turning of the upper frame means about a pivot axis when carrying out a load-depositing operation;

DESCRIPTION OF PREFERRED EMBODIMENTS

The load-carrying trailer-type vehicle illustrated in the drawings is intended to be used for transporting loads through relatively short distances, with the vehicle of the invention being connected, for example, to a tractor so as to be pulled thereby. The work involved in connection with transporting loads through relatively short distances is facilitated and speeded up by using a trailer of the type disclosed, for carrying loads in suitable cassettes or other containers, instead of utilizing conventional trailers. The particular cassettes or load-carrying containers are not illustrated in the drawings but may be, for example, containers for holding waste or sewage, or other container-types of transporting receptacles. The load-carrying structure may include a platform for supporting the load, or the load-carrying structure may include a suitable stand on which a cable spool is supported, for example. Thus, the invention has wide applicability in connection with many different types of loads including containerized loads as well as special loads such as large cable spools and the like.

Figure 1:
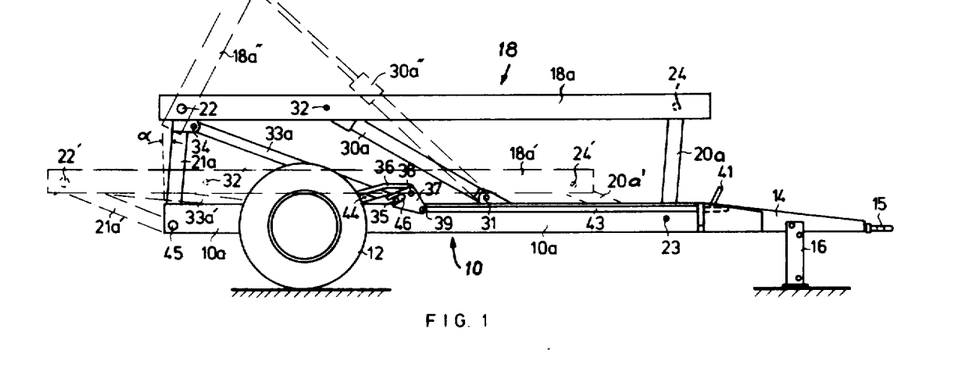
Figure 2:
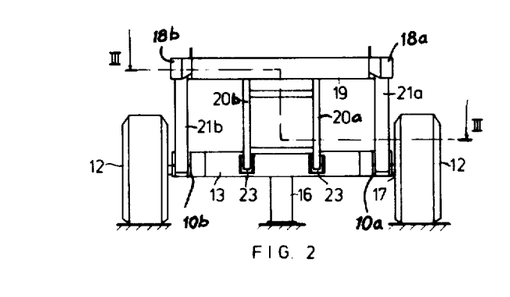
FIG. 2 is an end view of the structure of FIG. 1 as it appears when looking at the structure of FIG. 1 from the left of FIG. 1.
Figure 3:
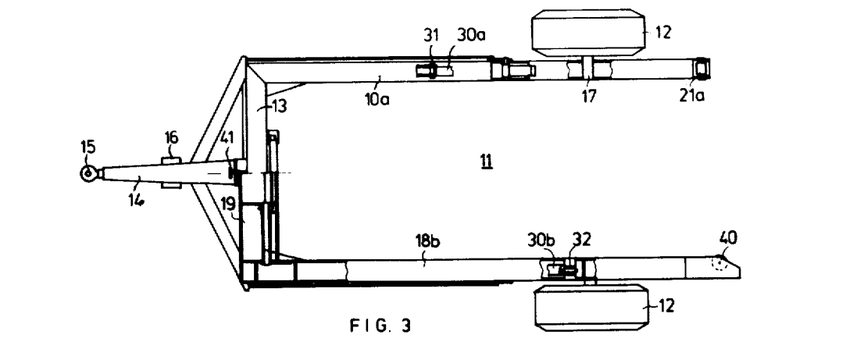
FIG. 3 is a partly broken away top plan view of the structure of FIG. 1 taken along line III—III of FIG. 2 in the direction of the arrows, the vehicle being shown in FIG. 3 oriented in a direction which is the reverse of that of FIG. 1.

Referring first to FIGS. 1–3, it will be seen that the illustrated trailer-type vehicle of the invention includes a lower frame means 10 which in plan is of a substantially U-shaped configuration, having an open rear and a pair of side bar means 10a and 10b, as well as a front transverse bar means 13 extending between and fixed to the pair of side bar means 10a and 10b which respectively extend rearwardly from the front transverse bar means 13.

Over the lower frame means 10 is an upper frame means 18 of substantially the same size and configuration as the lower frame means 10. Thus, the upper frame means 18 includes a pair of opposed longitudinal side bar means 18a and 18b which are fixed to and extend rearwardly from a front transverse bar means 19 of the upper frame means 18. Thus, the upper frame means 18 is situated at an elevation higher than the lower frame means 10 and includes a front transverse bar means 19 and a pair of side rearwardly extending transverse bar means 18a and 18b which are respectively situated over the front transverse bar means 13 and the pair of opposed longitudinal side bar means 10a and 10b of the lower frame means 10.

In order to be able to connect the vehicle to another vehicle, such as a tractor, for pulling the trailertype vehicle of the invention, the front transverse bar means 13 of the lower frame means 10 is fixed at a central region thereof with a forwardly extending drawbar 14 terminating at its front end in a suitable eye 15 capable of being connected in a known way to the rear of a tractor, for example. The drawbar 14 is pivotally connected with a supporting leg 16 which may be swung down to the position shown in FIG. 1 in order to support the drawbar 14 and maintain the vehicle in its attitude shown in FIG. 1 when the drawbar 14 is not connected to a pulling vehicle. In a known way, during travel, the vehicle of the invention can have the supporting leg 16 thereof retracted to another position extending along the lower surface of the drawbar 14.

At least a pair of wheels 12 are operatively connected with the opposed side bar means 10a and 10b of the lower frame means 10 to support the vehicle during travel thereof.

As is indicated in FIGS. 2 and 3, the wheels 12 are operatively connected with suitable short axles 17 which are received in suitable bearings of the pair of side bar means 10a and 10b.

Figure 1A:
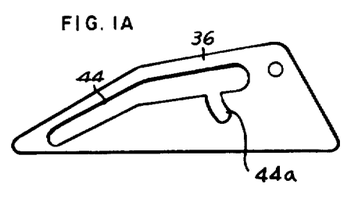
FIG. 1A shows part of a guiding and locking means for a releasable holding means which maintains the turning axis of the upper frame means stationary during a load-depositing operation.
Figure 1B:
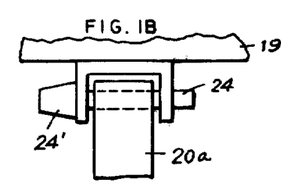
FIG. 1B is a fragmentary end view of the upper frame means of FIG. 1 as seen from the right of FIG. 1, illustrating how a pivot can be withdrawn in order to release the upper frame means for turning movement.

A connecting means is provided for connecting the upper frame means 18 to the lower frame means 10 in such a way that the upper frame means 18 can move from the upper load-carrying position shown in solid lines in FIG. 1 down to a lower load-receiving position shown in dot-dash lines in FIG. 1. In addition, the connecting means provides for the upper frame means 18 a transverse pivot axis about which the upper frame means can turn when carrying out a load-depositing operation, and the upper frame means is also shown in dot-dash lines in FIG. 1, at the upper left part of FIG. 1, when performing such a load-depositing operation. This connecting means includes a pair of front links 20a and 20b and a pair of rear links 21a and 21b. The front links 20a and 20b are respectively connected by horizontal pivots 23 to the front transverse bar means 13 of the lower frame means 10. Thus, at its rear surface the front bar means 13 fixedly carries a pair of brackets each of which has a pivot pin 23 fixed thereto and extending through openings at a lower end region of one of the links 20a and 20b. At their upper end regions the links 20a and 20b are formed also with horizontal openings receiving, respectively, a pair of pivot pins 24 which respectively extend through openings in brackets which are fixed to and extend downwardly from the lower surface of the front bar means 19 of the upper frame means 18. As is apparent from FIG. 1B, each pivot pin 24 carries at one end a handle 24' so that the operator can engage the handle 24' and withdraw each pivot 24 in order to disconnect the links 20a and 20b from the front bar means 19 of the upper frame means 18 for a purpose referred to below. The pivots 23 and 24 are schematically indicated in FIG. 1. As is apparent from FIG. 2, the pair of front links 20a and 20b are interconnected adjacent their upper end regions by a transverse bar so that the front links 20a and 20b will form a unitary frame structure interconnecting the upper and lower frame means at their front bar means.

At the rear region of the vehicle the connecting means includes a pair of rear links 21a and 21b. These rear links 21a and 21b are pivotally connected by pivot pins 45 to the rear end regions of the pair of side bar means 10a and 10b of the lower frame means 10, these pivots 45 passing through suitable openings at the lower end regions of the links 21a and 21b. At their upper end regions the links 21a and 21b are pivotally connected to the rear regions of the pair of side bar means 18a and 18b of the upper frame means 18 by way of a pair of pivots 22, respectively.

Thus, it will be seen that by way of this construction the connecting means provides at each side of a central longitudinal plane of the vehicle with the side bar means of the upper and lower frame means the equivalent of a parallelogram linkage. Moreover, by way of this connecting means the upper frame means 18 is connected with the lower frame means 10 so as to define with the latter a load-accommodating space 11 (FIG. 3) which is open at the rear.

A pair of expandable and contractable fluid-pressure means are respectively situated at opposite sides of and beyond the load-accommodating space 11 and are connected at each side of the latter space with the side bar means of the upper and lower frame means, respectively. Thus, it will be seen that a fluid pressure means 30a, in the form of a double-acting hydraulic cylinder-and-piston assembly, is connected between the pair of side bar means 10a and 18a, while a corresponding fluid-pressure means 30b is interconnected between the side bar means 10b and 18b of the upper and lower frame means, the fluid-pressure means 30b being identical with and connected in the same way to the upper and lower frame means as the fluid-pressure means 30a. Each of the side bar means 18a and 18b carries a pivot pin 32, and these pivot pins 32 have a common horizontal axis and serve to pivotally connect to the side bar means 18a and 18b, respectively, the upper ends of the piston rods of the piston-and-cylinder assemblies 30a and 30b. The pair of side bar means 10a and 10b of the lower frame means fixedly carries brackets which in turn respectively carry coaxial horizontal pivots 31 which serve to pivotally connect the cylinders of the piston-and-cylinder assemblies 30a and 30b respectively to the side bar means 10a and 10b. As is apparent particularly from FIG. 1, the pair of fluid-pressure means 30a and 30b respectively have their upper ends situated to the rear of their lower ends, and each piston-and-cylinder assembly 30a and 30b is inclined downwardly and forwardly from the upper frame means to the lower frame means. Moreover, it will be seen that when the parallelogram linkage formed by the upper and lower frame means and the links of connecting means is projected onto a vertical plane such as that of FIG. 1, the fluid-pressure means is situated substantially midway between the end links of the parallelogram linkage.

The upper frame means 18 is shown in solid lines in FIG. 1 in its load-transporting position. In order to diplace the upper frame means 18 from its load-transporting position down to its load-receiving position, the pair of fluid-pressure means 30a and 30b are expanded, and the upper frame means 18 moves down to the load-receiving position shown in dot-dash lines in FIG. 1 where the link 21a has been displaced to the position 21a' and the pivots 22 and 32 have been displaced to the positions 22' and 32'. It will be noted that the side bar means 18a is shown in the position 18a'- while the front link 20a is shown in the position 20a' and the pivot 24 is shown in the position 24', to indicate the load-receiving position of the upper frame means 18. Although it is also possible to provide an arrangement where the pair of fluid-pressure means 30a and 30b are inclined in a direction opposite to that shown in FIG. 1, so that the upper frame means moves forwardly and downwardly while the links turn in a clockwise direction, as viewed in FIG. 1, in order for the upper frame means to be lowered to its lower load-receiving position, the arrangement shown in FIG. 1 is preferred where the links turn in a counterclockwise direction, as viewed in FIG. 1, and the upper frame means 18 moves downwardly and rearwardly to the load-receiving position. Irrespective of whether the fluid-pressure means 30a and 30b are inclined as illustrated in FIg. 1 or in the opposite direction, when the upper frame means is raised from its lower load-receiving position to its upper load-transporting position, initially the component of movement is almost entirely vertical with very little if any horizontal component of movement, so that the load is immediately raised clear of the ground. However, it is preferred to provide the arrangement shown in FIG. 1 where the upper frame means 18 extends rearwardly from the lower frame means in the load-receiving position of the upper frame means since in this way the vehicle is extended toward the rear when in its load-receiving position, and this arrangement facilitates engaging the load.

The coaxial pivots 22 at the upper end regions of the rear links 21a and 21b of the connecting means define for the upper frame means 18 a transverse pivot axis about which the upper frame means 18 can turn when carrying out a load-depositing operation. As is apparent from FIG. 1, the pair of fluid-pressure means 30a and 30b expand both when moving the upper frame means 18 down to its lower load-receiving position and when turning the upper frame means 18 about the transverse pivot axis defined by the pair of coaxial pivots 22. The fluid-pressure means 30a is shown in the position 30a" while the side bar means 18 is shown in the position 18a" and the pivot 32 is shown in the position 32" in FIG. 1, which is the position these parts take during turning of the upper frame means 18 to its load-depositing position. Before the upper frame means 18 is turned about this transverse pivot axis to the load-depositing position, the operator engages the handles 24' of the pivots 24 and removes these pivots so that the front transverse bar means 19 of the upper frame means 18 is first disconnected from the front links 20a and 20b before the upper frame means 18 is turned to carry out a load-depositing operation. Of course, after a load-depositing operation has been completed, the pair of fluid-pressure means 30a and 30b are contracted to return the upper frame means 18 to the solid line position of FIG. 1, and then the pivots 24 are replaced to interconnect the front links 20a and 20b with the front transverse bar means 19 of the upper frame means 18.

A releasable holding means is provided for releasably holding the transverse pivot axis defined by the pins 22 stationary while the upper frame means 18 carries out a load-depositing operation. This releasable holding means includes a pair of elongated reaction rods, and one of these rods 33a is indicated in FIG. 1. The link 21a fixedly carries at its upper end region a bracket which in turn carries a pivot 34 to which the upper end of the rod 33a is pivoted. This rod 33a extends downwardly and forwardly from the upper end region of the rear link 21a to the side bar means 10a. It will be understood that in exactly the same way a rod which is identical with the rod 33a is pivotally connected to the upper end region of the link 21b and extends forwardly and downwardly to the other side bar means 10b. The releasable holding means includes a guide means and locking means for the lower ends of the reaction rods, of which only the reaction rod 33a is illustrated. Thus, each of these rods fixedly carries at its lower end region a horizontally extending pin 35, and the pin 35 of the rod 33a is indicated in FIG. 1. A plate 36 is fixed to each of the side bar means 10a and 10b and extends vertically and upwardly therefrom, each of these plates 36 having a guide slot 44 shown most clearly in FIG. 1A. This guide slot 44 forms with the plate 36 a guide means for the rod 33a, cooperating with the pin 35 which is fixed to and extends therefrom as described above. The guide slot 44 has a downwardly extending locking portion 44a which receives the pin 35 for locking the rod 33a against movement when the pin 35 is received in the portion 44a of the slot 44. Thus this portion 44a of the slot 44 forms at the plate 36 a lock means for releasably locking the rod 33a in the position illustrated in FIG. 1. When the pins 35 are respectively in the slots 44 of the pair of plates 36, the rods, of which only the rod 33a is illustrated, are free to move, and thus it will be seen that at this time the rod 33a can assume the position 33a' indicated in FIG. 1, this position being taken by the rod 33a when the upper frame means 18 has been lowered to its load-receiving position. However, when the pins 35 of the reaction rods are respectively in the portions 44a of the slots of the plates 36, the reaction rods are locked against movement, and this is the position which the parts take when the upper frame means 18 carries out a load-depositing operation, so that at this time the transverse pivot axis provided by the coaxial pins 22 cannot move.

By way of a pivot 38 a plate 37 is pivotally connected with each of the plates 36, and this plate 37 is formed with an elongated slot 46 which receives the pin 35, as illustrated in FIG. 1. By way of a pivot 39 an elongated rod 43 is connected at its rear to the plate 37, this rod 43 extending forwardly. Of course a pair of such rods 43 are situated on opposite sides of the lower frame means 10 and are pivotally connected at their rear ends by way of pivots 39 to a pair of plates 37 which are respectively pivoted to the plates 36 in the manner shown in FIG. 1. At their front ends the rods 43 are interconnected, for example, by a transverse bar from which a handle 41 extends upwardly, so that the operator can engage the handle 41 and displace the rods 43 forwardly or rearwardly. Upon rearward movement of the rods 43 the plates 37 are turned in unison in a clockwise direction about the common axis of the pivots 38, so that the slots 46 of the plates 37 are displaced upwardly into alignment with the guide slots 44 of the plates 36, thus situating the pins 35 in alignment with the guide slots 44 so that now the reaction rods are unlocked and are free to move at the lower ends along the guide slots 44. However, when the pins 35 are in the position shown in FIG. 1, the links 21a and 21b are locked so that the transverse pivot axis defined by the pins 22 is maintained stationary. Thus, when it is desired to lower the upper frame means 18 to its lower load-receiving position, the operator will displace the rods 43 rearwardly so as to situate the pins 35 in the guide slots 44, and now the pair of fluid-pressure means 30a and 30b can be expanded to lower the upper frame means 18 from its upper load-transporting position to its lower load-receiving position. Upon return of the upper frame means 18 from its lower load-receiving position to its upper load-transporting position, the pins 35 will move upwardly and forwardly along the slots 44 and directly into the slots 46, and these pins 35 will when they reach the slot portions 44a automatically move down into the latter so as to automatically engage the locking means for releasably locking the structure in the position shown in solid lines FIG. 1, until the operator again displaces the pair of rods 43 rearwardly. If desired a suitable locking tab may be provided behind which the lock pins 34 are secured.

Of course, once the releasable locking means has been unlocked and the upper frame means 18 has been lowered to its lower load-receiving position, the trailer of the invention can be rearwardly moved so that a load which is to be transported is received in the load-accommodating space 11. For example a load-carrying cassette will have at its opposed side walls a pair of projecting lugs beneath which the pair of side bar means 18a and 18b move when the trailer is backed with respect to the load which is to be carried. As is apparent from FIG. 3, the pair of side bar means 18a and 18b can carry at their inner rear portions guide rollers 40 for engaging the load-carrying container so as to facilitate receiving of the load in the load-accomodating space 11. Once the trailer has been properly positioned with respect to the load which is to be transported, the pair of fluid-pressure means 30a and 30b are contracted, so as to raise the frame means 18 to the upper load-transporting position thereof. As was indicated above, the lifting of the load initially is virtually entirely in a vertical direction so that the bottom of the load is not dragged along the ground. Moreover, as is indicated by the angle α in FIG. 1, during the raising of the upper frame means to its upper load-transporting position, the links 20a, 20b, 21a, and 21b of the connecting means are turned through and slightly beyond their vertical dead-center positions, while the pins 35 automatically enter into the slot portions 44a, as described above, to limit the movement of the upper frame means to its upper load-transporting position. As a result of this arrangement, during load-transporting operations there is no stress on the hydraulic structure.

Depositing of the load is carried out, as described above, by removing the pivots 24 and then again expanding the pair of fluid-pressure means 30a and 30b, so that the upper frame means will now turn about the transverse pivot axis defined by the pivots 22, and it will be noted that for this purpose the rod 33a, and its corresponding rod, remain locked. It will be noted that the upper frame means 18 turns through a rather large angle in connection with a load-depositing operation, this angle being almost 90°, and the return of the upper frame means to its load-transporting position after depositing a load is carried out very quickly because of the fast contraction which is possible for the double-acting hydraulic pressure assemblies 30a and 30b.

Figure 4:
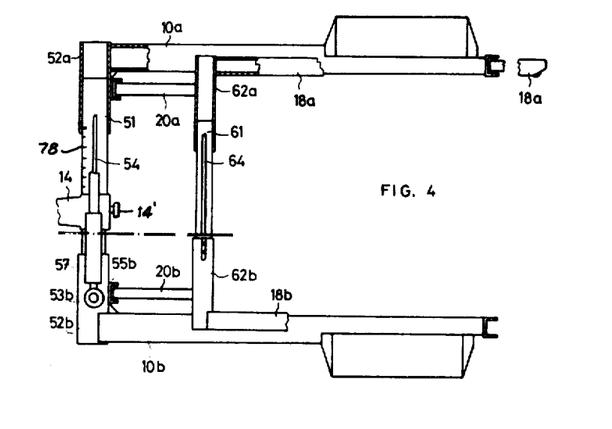
FIG. 4 is a schematic partly sectional top plan view of another embodiment of the invention according to which the vehicle can be adjusted to accommodate different loads, FIG. 4 showing the structure adjusted to its maximum width.
Figure 5:
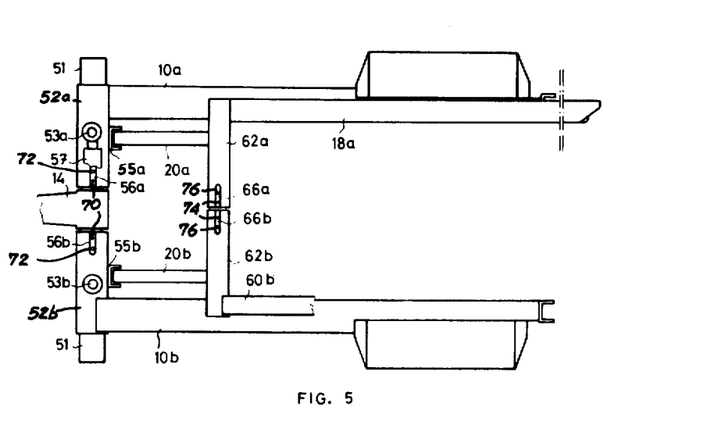
FIG. 5 is a top plan view showing the structure of FIG. 4 adjusted to its minimum width.
Figure 6:
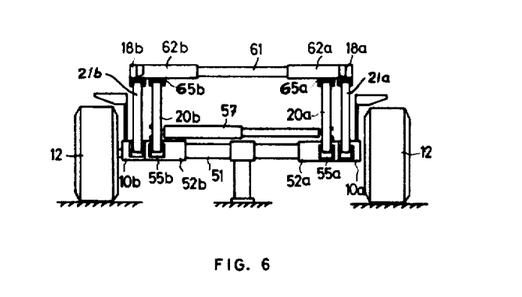
FIG. 6 is a rear elevation of the structure of FIGS. 4 and 5 with the upper frame means in its load-transporting position.

The embodiments of the invention illustrated in FIGS. 4-10 include all the above features of FIGS. 1-3 as well as additional features by way of which it is possible to adjust the size of the load-accommodating space 11 for example between the maximum width thereof illustrated in FIG. 4 and the minimum width thereof illustrated in FIG. 5. For this purpose the pair of side bar means 10a and 10b of the lower frame means are fixed to and project rearwardly from a pair of end members 52a and 52b of the front transverse bar means of the lower frame means of the embodiment shown in FIG. 4. These end members 52a and 52b of the front transverse bar means at the lower frame means of FIG. 4 are in the form of tubular members which are telescoped onto and freely slidable with respect to an intermediate member 51 in the form of a bar which is received slidably in the tubular members 52a and 52b, as illustrated in FIG. 4. Thus, the members 52a and 52b are of the same cross section as the intermediate member 54 and fit with a relatively loose sliding fit thereon. In much the same way, the front transverse bar means of the upper frame means 18 includes a pair of tubular end members 62a and 62b which are telescoped onto and slidably receive opposed portions of an intermediate bar member 61. Thus, it will be seen that the pair of side bar means 18a and 18b are fixed to and project rearwardly from the end members 62a and 62b. Thus it will be seen that all of the bar means of the embodiment of FIG. 4 cooperate with each other to enable the width of the load-accommodating space to be adjusted. In order to effect this adjustment an adjusting means in provided. This adjusting means takes the form of a suitable power means which in the example of FIGS. 4–6 is a hydraulic power means. This hydraulic power means includes a double-acting piston-and-cylinder assembly 57. The piston of the assembly 57 is fixed at its free end to a vertical sleeve which receives in its interior a pin 53a which is fixed to the tubular end member 52a. The cylinder of the assembly 57 is fixed at its free end to a vertical sleeve which receives a pin 53b which is fixed to and projects upwardly from the tubular end member 52b. The drawbar 14 is fixed centrally to the intermediate member 51 of the front transverse bar means of the lower frame means 10 of this embodiment, or the drawbar 14 may have at its rear a tubular portion through which the intermediate member 51 freely extends, this intermediate member 51 being formed with an arcuate groove which extends circumferentially about the axis of the intermediate bar 51 and which receives the free end of a screw 14' which extends through the wall of the rear tubular portion of the drawbar 14, as shown schematically in FIG. 4. Thus with this arrangement it is possible for the drawbar 14 to turn about the horizontal axis of the intermediate member 51 while remaining centrally connected thereto. Thus in this case the drawbar 14 also is slidable with respect to the intermediate member 51.

In the embodiment of FIGS. 4–6, the front links 20a and 20b of the connecting means are pivotally connected by way of pivots 55a and 55b respectively to the end members 52a and 52b, at the lower end regions of the links 20a and 20b and by way of pivots 65a and 65b to the pair of end members 62a and 62b, at the upper end regions of the links 20a and 20b. The rear links 21a and 21b interconnect the side bar means of the upper and lower frame means to each other in the same way as described above in connection with FIGS. 1–3. Thus, with this arrangement, the single power means 57 connected between the end members 52a and 52b is capable of expanding and contracting to displace both the upper and lower frame means between the positions of FIGS. 4 and 5 which respectively illustrate the maximum and minimum widths for the load-accommodating space.

A limiting means is provided to limit the displacement of the side bar means of each frame means apart from each other, so as to limit the maximum width of the load-accommodating space. Such a limiting means is provided so that in the maximum-width position of the trailer there will still be substantial portions of the intermediate members 51 and 61 in the tubular end members of the pair of front transverse bar means of the lower and upper frame means. The limiting means includes elongated grooves 54 and 64 respectively formed in the intermediate bars 51 and 61 at the upper surfaces thereof, these grooves 54 and 64 extending parallel to the axis of the intermediate bars 51 and 61. As is indicated in FIG. 5, the inner end regions of the tubular end members 52a and 52b have elongated relatively short metal strips 56a and 56b respectively fixed thereto, for example by screws 70. Outwardly beyond the screws 70 these strips 56a and 56b respectively fixedly carry pins 72 which extend through the tubes 52a and 52b into the groove 54. In the same way the tubular end members 62a and 62b fixedly carries strips 66a and 66b fixed to these members by way of screws 74 and carrying pins 76 which extend into the groove 64. The arrangment is such that when the end members 52a, 52b and 62a, 62b are displaced to the positions indicated in FIG. 4, the pins 72 will respectively engage the opposed ends of the groove 54 while the pins 76 will respectively engage the opposed ends of the groove 64, and thus outward movement of the tubular end members with respect to the intermediate bar members is limited. Of course, these strips 56a, 56b and 66a, 66b are attached to the tubular end members after the latter have been placed on the intermediate bars 51 and 61, respectively.

Moreover, as is shown in FIG. 4, the intermediate member 51 is provided with a scale of graduations 78 visible to the operator. These graduations 78 cooperate, for example, with the inner end of the tubular end member 52a for indicating to the operator the adjusted size of the load-accommodating space.

According to a further feature of the invention, the force which can be exerted by the power means 57 is limited in such a way that this power means 57 cannot change the adjusted size of the trailer when the latter carries any load of reasonable magnitude. In order to change the width of the load-accommodating space it is necessary for the trailer to be unloaded and in addition it is necessary that the trailer be in motion. While the trailer is pulled by the pulling vehicle such as a suitable tractor or the like, it is possible for the operator to operate the power means 57 so as to adjust the width of the trailer. Otherwise, when the trailer is stationary the friction between the wheels 12 and the ground, this friction being determined by the weight of the unloaded trailer itself, is too great to permit the adjustment of the width to be carried out. Thus as a safety feature, if any load is carried, it is impossible at this time to change the adjusted width. Only when the trailer is unloaded and only when it is moving is it possible for the power means 57 to exert a force sufficiently great to bring about a change in the width of the load-accommodating space.

It is to be noted that in addition the power means 57 is situated along the upper part of the front transverse bar means of the lower frame means so that the power means 57 is on the one hand well-protected and is on the other hand situated in such a way that it does not curtail the useful length of the load space. In addition this situation the power means 57 is such that the force thereof can be efficiently utilized. The result of all of the above factors is that the power means 57 can have rather small dimensions so that the stresses imposed thereby on adjacent structure are small.

It will be noted that by way of a structure such as the screw 14' extending into a circumferential groove on the bar 51, it is possible on the one hand to maintain the drawbar 14 centered while on the other hand it can turn about the axis of the member 51 to enable the trailer to occupy a relatively small space when it is not in use.

Figure 7:
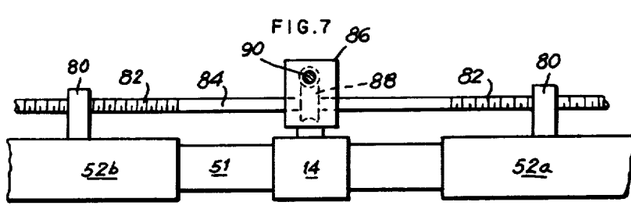
FIG. 7 is a fragmentary transverse elevation showing a different type of power means for adjusting the width of the vehicle.

Instead of utilizing a hydraulic double-acting power means 57, it is possible also to utilize a screw-type of power means, as illustrated in FIG. 7. Thus, referring to FIG. 7 it will be seen that the tubular end members 52a and 52b fixedly carry upwardly extending posts 80 which are respectively formed with threaded throughbores which respectively receive the threaded portions 82 of a rotary screw member 84. These threaded portions 82 as well as the threads in throughbores of the posts 80 are oppositely directed, so that one of these threads is a right hand thread while the other is a left hand thread. As a result, during turning of the screw 84 in one direction or the other the tubular members 52a and 52b will be pulled toward each other or will be displaced away from each other. In a suitable housing 86 which is fixedly carried by the drawbar 14, for example, there is a worm wheel 88 which coaxially surrounds and is fixed to the screw member 84 which passes through the housing 86. This worm wheel 88 meshes with a worm 90 which extends into the housing 86. The worm 90 may be turned either by hand or by any suitable motor, or a friction wheel and belt-type of transmission may be provided from a revolving wheel of the trailer so as to provide for the rotary movement of the worm 90 in one direction or the other to bring about movement of the tubular members 52a and 52b toward and away from each other with a transmission as shown in FIG. 7. Thus in this way also it is possible to bring about the adjustment of the width of the load-accommodating space of the trailer of the invention.

Figures 8, 10:
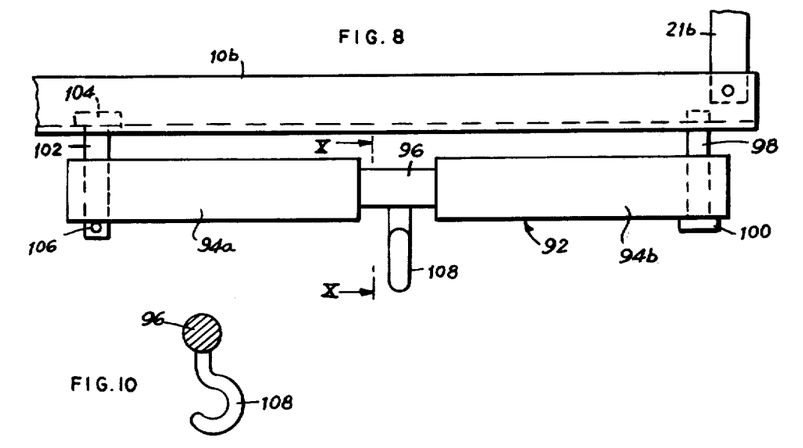
FIG. 8 is a fragmentary longitudinal side view showing a further modification according to which an additional bar means is provided for connecting a further vehicle to the vehicle shown in FIGS. 4–6.
FIG. 10 is a transverse section of the intermediate portion of the bar structure of FIG. 8 taken along line X—X of FIG. 8 in the direction of the arrows, and showing a hook used to attach a further vehicle to the vehicle of FIGS. 4–6.
Figure 9:
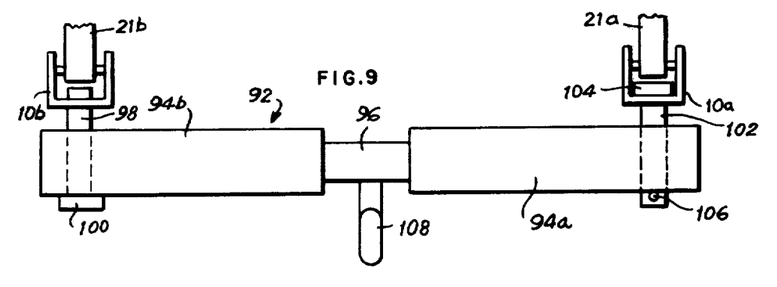
FIG. 9 shows the embodiment of FIG. 8 in its position of use, in a schematic manner.

According to a further feature of the invention as shown in FIGS. 8-10, an elongated bar means 92 is capable of being moved by the operator between the position of non-use shown in FIG. 8 and the position of use shown in FIG. 9, so that this bar means 92 is available for connecting a further trailer to the trailer of the invention to be pulled together with the trailer of the invention by a tractor or the like. The elongated bar means 92 includes a pair of tubular end members 94a and 94b telescoped onto an intermediate bar member 96 which is slidably received in the interiors of the tubular end members 94a and 94b. A vertical pin 98 which is fixed to the rear end portion of the side bar means 10b extends downwardly through a pair of aligned openings in the outer end region of the end member 94b and has a lower head end 100, so that in this way the pin 98 supports the bar means 92 for swinging movement about the vertical axis of the pin 98 which is situated at the rear end region of the side bar means 10b. The outer end region of the tubular end member 94a is also formed with a pair of aligned openings. The shank of an elongated bolt 102 extends through these openings of the end member 94a. The bolt 102 has a head end 104 which rests on the side bar means 10b in the position of the parts shown in FIG. 8, this bolt 102 having at its bottom end a throughbore which receives a cross pin 106 which thus serves to retain the elongated bar means 92 in the position of non-use shown in FIG. 8 where the bar means 92 extends beneath the bar means 10b. As is indicated in FIG. 10, the central region of the intermediate member 96 of the elongated adjustable bar means 92 fixedly carries a hook 108 by means of which this bar means 92 can be connected to the eye at the front end of a drawbar of another vehicle similar to that of the present invention.

When it is desired to connect such an additional vehicle to the vehicle of the invention to be pulled thereby, the holding pin 106 is removed from the bottom end of the bolt 102 and the latter is removed from the bar means 10b. This bolt 102 is then placed through an opening formed in the free rear end region of the bar means 10a, as shown in FIG. 9. The elongated bar means 92 is of course swung from the position of FIG. 8 to the position of FIG. 9, which is the position of use of the bar means 92 where it extends across and between the pair of side bar means 10a and 10b. The bolt 102 is again placed through the openings in the free end of the tubular end member 94a, and the cross pin 106 is replaced, so that the elongated bar means 92 will remain in the position shown in FIG. 9. Of course because of the telescoped cooperation of the tubular end members 94a and 94b with the intermediate member 96 it is possible for the elongated bar means 92 to adapt itself to the adjusted distance between the pair of side bar means 10a and 10b. Thus, through this expedient it is possible to connect the trailer of the invention to an additional trailer of the invention or any other trailer.

It is to be noted that one of the important features of the invention resides in the location of the double-acting fluid-pressure means 30a and 30b and their cooperation with the reaction rods of which only the rod 33a is illustrated, these rods being pivotally connected at their upper ends to the rear links 21a and 21b at locations very close to the transverse pivot axis defined by the pair of pivots 22, the upper frame means of course turning about this pivot axis when carrying out a load-depositing operation as described above. It is to be noted that these reaction rods are much longer than the rear links 21a and 21b. Of course, the reaction rods may be replaced by other equivalent means which will achieve the same result. Such a means might be, for example, a suitable locking means operatively connected with the rear links 21a and 21b at the region of their lower pivots 45. However, while an arrangement of this latter type might achieve the desired results, it has the serious disadvantage of being subjected to relatively high stresses. For these reasons the structure described above and shown in the drawings is preferred.

Of course, the invention is not to be narrowly confined to the details of the embodiments shown in the drawings and described above. Various details of the invention may vary within the scope of the inventive concept as defined by the claims which follow.

What is claimed is:

1. A vehicle for lifting, transporting, and depositing a load, comprising lower frame means of substantially U-shaped configuration having a front transverse bar means adapted to be attached to a pulling vehicle and a pair of opposed side longitudinal bar means connected with and extending rearwardly from said front transverse bar means and defining with the latter a space for accommodating a load, at least a pair of wheels being operatively connected with said pair of opposed side bar means to support said lower frame means during travel thereof, upper frame means also of substantially U-shaped configuration situated at an elevation higher than said lower frame means and being of substantially the same size and configuration as said lower frame means, said upper frame means also having a front transverse bar means and a pair of opposed side bar means connected with said front transverse bar means of said upper frame means and extending rearwardly therefrom for also defining with said lower frame means a space for accommodating a load, connecting means extending between and interconnected with said lower frame means and said upper frame means for connecting said upper frame means to said lower frame means for movement with respect thereto downwardly to a lower load-receiving position and upwardly to an upper load-transporting position, said connecting means also providing for said upper frame means a transverse pivot axis about which said upper frame means turns when carrying out a load-depositing operation, a pair of expandable and contractable fluid-pressure means respectively situated on opposite sides of and beyond the load-accommodating space defined by said upper and lower frame means with each of said fluid-pressure means being operatively connected to a side bar means of said lower frame means and a side bar means of said upper frame means for lowering said upper frame means from said upper load-transporting position thereof down to said lower load-receiving position thereof during expansion of each fluid-pressure means and for turning said upper frame means about said pivot axis during a load-depositing operation also during expansion of each fluid-pressure means, and releasable holding means operatively connected between part of said connecting means and said lower frame means for releasably holding said pivot axis stationary during turning of said upper frame means about said pivot axis when carrying out a load-depositing operation.

2. The combination of claim 1 and wherein each of said fluid-pressure means has an upper end region operatively connected with a side bar means of said upper frame means and a lower end region operatively connected with a side bar means of said lower frame means, said lower end region of each fluid-pressure means being situated forwardly of said upper end region thereof and each fluid-pressure means being inclined downwardly in a forward direction from said upper frame means toward said lower frame means.

3. The combination of claim 1 and wherein said connecting means includes between said upper and lower frame means on each side of a central vertical plane situated midway between said side bar means of each frame means, a pair of links longitudinally spaced from each other along each frame means and defining a parallelogram linkage therewith, and each fluid-pressure means being situated substantially midway between said links of each parallelogram linkage.

4. The combination of claim 1 and wherein said connecting means includes a pair of rear links each extending between and pivotally connected with a side bar means of said lower frame means and a side bar means of said upper frame means, said rear links defining with said upper frame means said transverse pivot axis about which said upper frame means turns when carrying out a load-depositing operation, and said releasable holding means including a pair of elongated rods respectively pivotally connected with said rear links adjacent said pivot axis, respectively having lengths substantially greater than said rear links, and respectively extending from said rear links to the region of said pair of side bar means of said lower frame means, and said releasable holding means including at said pair of side bar means of said lower frame means a pair of guide means guiding said rods for movement with respect to said pair of side bar means of said lower frame means, respectively, and a pair of means for releasably locking said pair of rods to said side bar means of said lower frame means, respectively, when said pair of fluid-pressure means expand to turn said upper frame means about said transverse pivot axis during a load-depositing operation.

5. The combination of claim 1 and wherein said connecting means includes at least one link situated between and pivotally connected with the side bar means of said upper and lower frame means at each side of the load-accommodating space, said fluid-pressure means when displacing said upper frame means from said lower load-receiving position to said upper load-transporting position thereof turning each of said links through and beyond an upright, precisely vertical, dead-center position.

6. The combination of claim 1 wherein all of said bar means of each frame means are operatively connected with each other for effecting a change in the distance between the side bar means of each frame means for adjusting the width of the load-accommodating space, and adjusting means operatively connected with at least one of said frame means for adjusting the distance between the pairs of side bar means of said upper and lower frame means.

7. The combination of claim 6 and wherein each of said front transverse bar means includes a pair of end members respectively fixed with the side bar means of each frame means and an intermediate member cooperating telescopically with said end members for effecting the change in the distance between the side bar means of each frame means.

8. The combination of claim 7 and wherein said adjusting means includes a power means extending between and operatively connected with said end members of one of said front bar means for moving said end members toward and away from each other to effect the adjustment of the distance between the pair of side bar means of each frame means.

9. The combination of claim 8 and wherein said power means includes a double-acting hydraulic means.

10. The combination of claim 8 and wherein said power means includes a rotary screw means having a threaded connection with said pair of end members.

11. The combination of claim 7 and wherein a limiting means is operatively connected with the intermediate and end members of at least one of said front bar means for limiting the extent to which said end members move apart from each other.

12. The combination of claim 11 and wherein said limiting means includes a part of said intermediate member formed with a longitudinal groove and a pair of pins fixed to said end members and situated in said groove for respectively engaging opposed ends thereof to limit the movement of said end members apart from each other.

13. The combination of claim 6 and wherein at least one of said frame means carries an indicating means for indicating the adjusted size of the space between the pair of side bar means of each frame means.

14. The combination of claim 6 and wherein said pair of side bar means of said lower frame means respectively have free rear end regions distant from said front bar means of said lower frame means, and an elongated bar means of adjustable length pivotally connected with the rear end region of one of said side bar means of said lower frame means for turning movement with respect thereto between a position of non-use extending along said one side bar means of said lower frame means and a position of use extending transversely between said rear end regions of said side bar means of said lower frame means, and means for releasably connecting the latter elongated bar means to the rear end region of the other of said side bar means of said lower frame means when said latter elongated bar means is in said position of use thereof, whereby in said position of use of said elongated bar means a further vehicle may be attached thereto.

* * * * *